US006523564B1

(12) United States Patent
Phillips

(10) Patent No.: US 6,523,564 B1
(45) Date of Patent: Feb. 25, 2003

(54) ABOVE GROUND OVERFILL VALVE

(75) Inventor: Paul Phillips, Whitehall, MI (US)

(73) Assignee: EBW, Inc., Muskegon, MI (US)

( * ) Notice: Subject to any disclaimer, the term of this patent is extended or adjusted under 35 U.S.C. 154(b) by 0 days.

(21) Appl. No.: 09/574,997

(22) Filed: May 19, 2000

(51) Int. Cl.[7] .......................... F16K 31/26; F16K 33/00

(52) U.S. Cl. ....................... 137/430; 137/432; 137/442; 137/445; 141/198

(58) Field of Search ................................ 137/409, 413, 137/430, 432, 442, 433, 444, 445, 448; 414/59, 198

(56) References Cited

U.S. PATENT DOCUMENTS

| | | | | | |
|---|---|---|---|---|---|
| 1,268,947 | A | | 6/1918 | Fell | 141/198 |
| 2,098,131 | A | | 11/1937 | Bluhm | 137/445 |
| 3,078,867 | A | | 2/1963 | McGillis et al. | 137/416 |
| 3,428,966 | A | * | 2/1969 | Schoepe et al. | 137/432 |
| 5,010,915 | A | * | 4/1991 | Johnson et al. | 137/423 |
| 5,027,870 | A | | 7/1991 | Butterfield | 141/198 |
| 5,095,937 | A | * | 3/1992 | LeBlanc et al. | 137/423 |
| 5,141,019 | A | * | 8/1992 | LeBlanc et al. | 137/423 |
| 5,174,345 | A | | 12/1992 | Kesterman | 141/198 |
| 5,235,999 | A | * | 8/1993 | Lindquist et al. | 137/433 |
| 5,388,622 | A | | 2/1995 | Phillips | 141/198 |
| 5,427,137 | A | * | 6/1995 | Bowen | 137/432 |
| 5,472,012 | A | | 12/1995 | Wood et al. | 137/430 |
| 5,485,866 | A | * | 1/1996 | Bowen | 137/554 |
| 5,518,024 | A | * | 5/1996 | Weeks et al. | 137/420 |
| 5,655,565 | A | * | 8/1997 | Phillips et al. | 137/413 |
| 5,839,465 | A | * | 11/1998 | Phillips et al. | 137/413 |

* cited by examiner

*Primary Examiner*—George L. Walton
(74) *Attorney, Agent, or Firm*—Young & Basile, P.C.

(57) ABSTRACT

An aboveground tank auto-limiter is provided for preventing the overflow of fluid via storage tanks. The auto-limiter includes a valve assembly insertable downward through the top of a fill pipe of the fuel storage tank. The valve assembly has a cylindrical valve housing providing a fluid flank passage directing fuel downward into the storage tank under pressure. A hollow cylindrical float is provided in the valve assembly and is coaxially mounted along the outside surface of the valve housing leading into the storage tank. The float moves vertically to slide freely along the upper portion of the valve housing with the fluctuation of the fuel level within the tank. A series of linkage assemblies communicates the cylindrical float to a poppet located downstream from the float, wherein the float is upstream from the poppet. The poppet is seated in the closed position. A bleed valve disposed in the valve assembly above the poppet valve functions independently from the linkage assemblies and the poppet to allow a certain amount of excess fuel that is captured within the valve housing when the fluid flow passageway is closed to bleed into the storage tank when pressure in the valve assembly is released.

17 Claims, 2 Drawing Sheets

ABOVE GROUND OVERFILL VALVE

FIELD OF THE INVENTION

The present invention is directed to a float actuated shutoff valve to terminate the flow of fuel into a storage tank to prevent overfilling of the tank.

BACKGROUND OF THE INVENTION

The valve of the present invention is particularly adapted for controlling the filling of aboveground fuel storage tanks. These tanks are filled by pumping fuel from tank trucks by means of a large diameter hose which sealingly couples to the upper end of fill pipes during the filling operation. Because of the relatively large capacity of the storage tanks, a relatively high flow rate during the filling operation is desirable and flow rates in the general range of 200 gpm are typical. As a result of these high flow rates, it is quite common that the tank is overfilled resulting in a spill. As much as 25 gallons of fuel may be involved in such a spillage. To prevent the spillage from contaminating the soil, it is now required in many locations that the fill pipe be equipped with an overfill storage container. However, prevention of overfilling of the tank is obviously the more desirable solution.

To prevent overfilling, many present day aboveground storage tanks are provided with a float actuated valve which closes when the level of fuel within the aboveground storage tank rises to a predetermined level, for example, when the tank is 90% full.

Although the recommended practice for an aboveground storage tank is to fill no more than 90% of the tank to allow for thermal expansion, the distance from the top of the storage tank to the fuel when the storage tank is at 90% capacity can vary greatly from tank to tank. On large diameter tanks, the free space of a 90% full tank can be a distance of 8 inches or more. On small diameter, square, or rectangular tanks, the free space or distance of the fuel from the top of the storage tank may be as small as an inch when the tank is filled to 90% capacity.

With previously known actuating shutoff valves, the position ofthe floats relative to the valve body requires at least 9 inches between the top of the tank and the center line of the float at shutoff. As a result, any storage tank with less than 9 inches of free space could not be filled to 90% capacity.

SUMMARY OF THE INVENTION

The present invention is directed to a solution to the aforementioned concerned. According to the present invcntiori, a valve assembly is provided extending downward through the top of the aboveground fuel storage tank. The valve assembly includes a cylindrical valve housing mounted to the lower end of the fuel pipe which extends downward through a riser welded to the top of the storage tank. The valve housing provides a fluid flow passageway in which incoming fuel is directed downward into the storage tank uader pressure. A hollow cylindrical float assembly is provided at the top portion of the valve assembly and is coaxially mounted along the outside surface of a pipe leading into the storage tank. The float slides vertically along the pipe with the fluctuation of the fuel level il the storage tank. A series of linkage assemblies connect the float to a poppet. A valve seat is provided in the fluid flow passageway such that when the poppet is closed against the valve seat, fluid flow is prevented from passing through the fluid passageway. The hollow cylindrical float assembly is positioned above the valve seat so that the fluid can rise to a higher level within the storage tank before the float assembly rises and closes the poppet against the valve seat.

In another aspect of the invention, a check-ball valve is provided in the fluid flow passageway upstream with respect to the poppet valve. The check-ball valve allows excess fuel above the valve to escape into the storage tank after pumping pressure of the fluid has ceased. When. the poppet valve is closed and fel flow stops, a certain amount of excess fuel is trapped in the valve housing above the poppet valve. When fluid flow is shut off, the pressure is relieved, the check-ball valve unseats from the check-valve seat and fiel is allowed to bleed through the orifice into the storage tank.

The bleed valve may also have other configurations such as a flexible membrane wherein the flexible membrane expands across a pair of annular extensions extending inwardly into the flow path forming a recess therebetween. Another draw assembly may include a poppet valve in a bore providing a recess structure in the fluid flow passageway upstream from the poppet valve. The check-ball and spring are disposed within a counter-bore of the bleed valve.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The valve assembly of the present invention takes the form of a valve housing adapted to be vertically mounted at the lower end of the fill pipe to the storage tank. An elongated hollow drop tube extends downward. from the valve housing into the storage tank. At the lower end of the fill pipe, a cylindrical float is slidably received on the exterior of the fill pipe. Actuating rods extend downwady from the float to the valve housing to be coupled by actuating linkages to butterfly valves and/or poppet valves.

Figure 1:
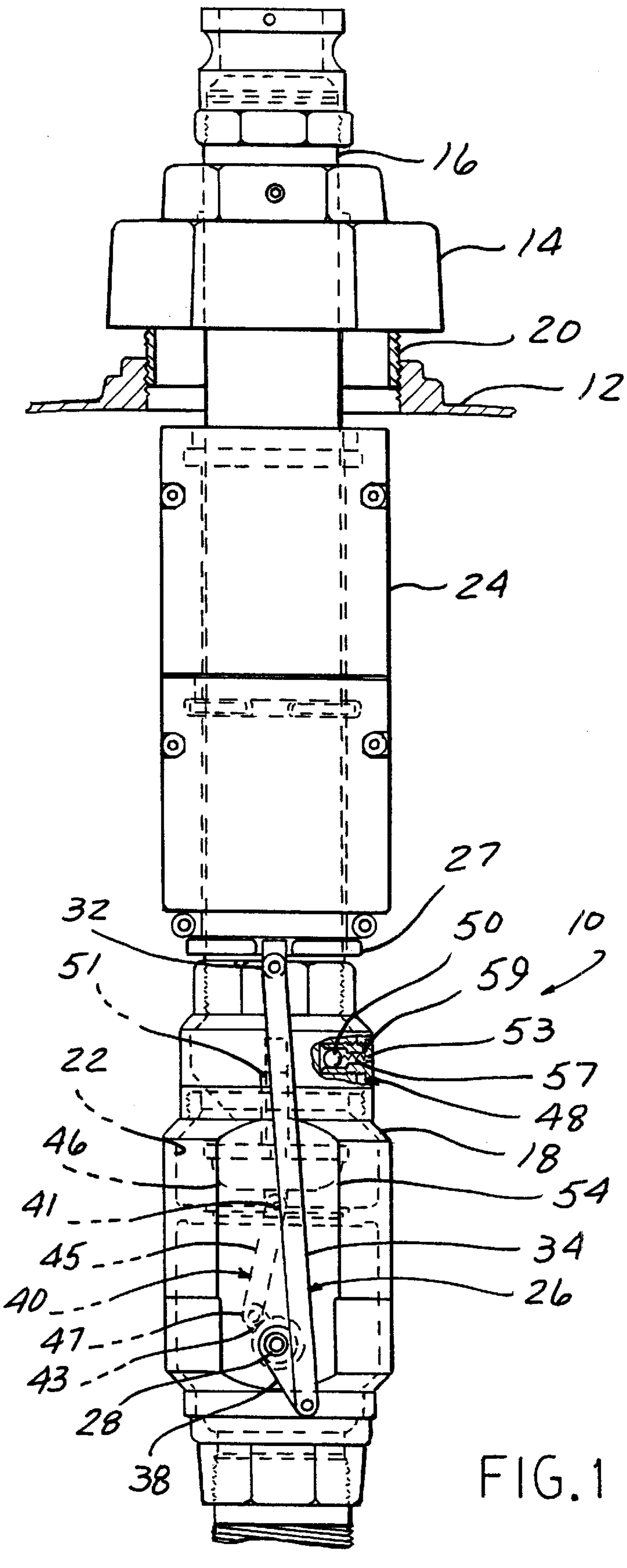
FIG. 1 is an overall side elevational view of valve assembly, according to the present invention, with the valve assembly in an open position.
Figure 2:
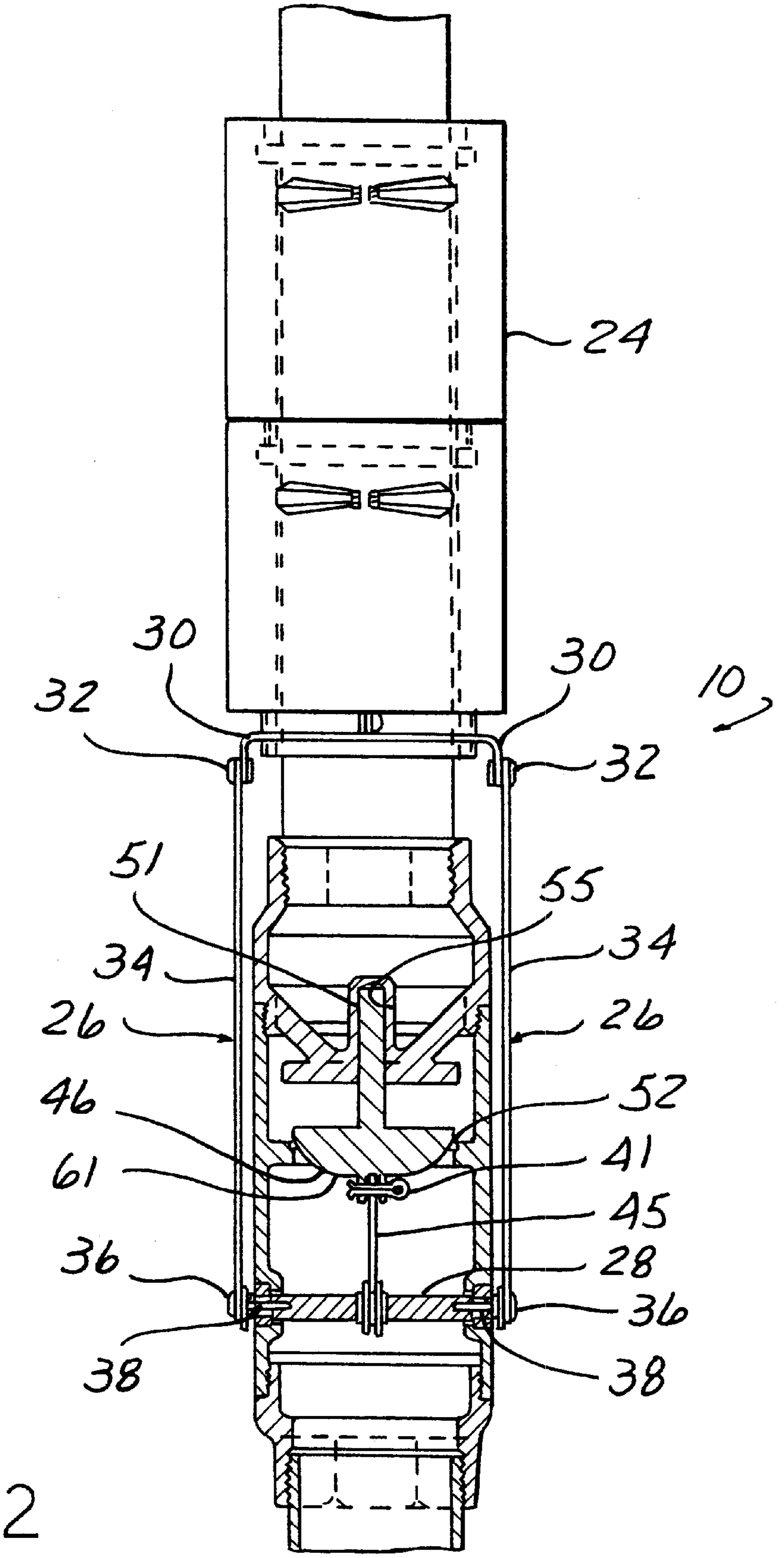
FIG. 2 is a side elevational view of FIG. 1 showing the valve assembly in the closed position showing further details of the valve assembly.

The valve assembly of the preferred embodiment is shown in FIGS. 1 and 2. Te valve assembly 10 is connected to the lower end of the fill pipe 16 which extends downwardly through the top of all abovegrotnd fuel storage tank 12. The coupling member 14 is threadably and sealingly secured to the upper end of the fill pipe 16. The valve assembly 10 includes a cylindrical valve housing 18 mounted to the lower end of the fill pipe 16 which extends downwardly through a riser 20 welded to the top of the storage tans 12. The valve housing 18 provides a drop tube 22 forming a fluid flow passageway for incoming fuel to direct the incoming fuel downward into the storage tank 12 under pressure.

A hollow cylindrical float 24 is provided near the top of the valve assembly 10 proximate to the coupling member 14.

The float 24 is coaxially mounted along the outer surface 19 of the fill pipe 16 and is free to slide vertically along the upper portion of the fill pipe 16. The float 24 moves with the fluctuation of the fluid level within the storage tank 18 and is restricted in its movement by linkage assemblies. A pair of first linkage assemblies 26 are connected to a lower end 27 of the float 24 at one end of the assembly 26 and to a first centrally disposed pivot pin 28 that extends through the valve housing 18 and the fluid flow passageway. The pair of first linkage assemblies 26 are mounted outside of the valve house 18 such that each linkage assembly is diametrically opposed from the other linkage assemblies with respect to valve housing 18. Each diametrically opposed linkage assembly 26 includes three links. The first link 30 has an "L" shaped configuration with one end rigidly connected to the float 24 and an opposing end connected to a first pivot pin 32. The second link 34 is rigidly connected to the first link 30 at the first pivot pin 32 and extends downwardly and away from the float 24 to be connected to a second pivot pin 36 at an opposite end and is spaced from a longitudinal axis of the valve housing 18 a distance greater than a maximum outer radius of the valve housing. The third link 38 is fixedly mounted to the second pivot pin 36 at one end and to the centrally disposed pivot pin 28 such that the centrally disposed pivot pin rotates with the vertical displacement of the float 24.

The centrally disposed pivot pin 28 is also connected to a second linkage assembly 40 disposed in the fluid flow passageway of the valve housing 18. The first end of the second linkage assembly 40 is pivotally connected to the centrally disposed pivot pin 28, and the opposing end of the second linkage assembly 40 is connected to a poppet valve 46. The second linkage assembly 40 is located in the fluid flow passageway and connected to the poppet valve 46 by a cotter pin 41. The second linkage assembly 40 includes link 43 connected to centrally disposed pivot pin 28 and link 45 connected to poppet 46 at cotter pin 41. Link arm 43 and link arm 45 are pivotally connected to each other by pivot pin 47. The poppet valve 46 is slidably disposed within an upper portion 54 of the valve housing 18 for vertical movement between a closed position and an open position in response to the movement of the float 24. The poppet valve 46 has an upper stem 51 maintained in an alignment with a valve seat by sliding engagement within a slot 55 in the upper portion of the valve housing 18. The poppet valve 46 is in a closed position when poppet valve 46 is seated against annular seat 52. The poppet valve 46 has a lower portion 61 designed into a dome-shaped configuration. The domed-shaped poppet valve 46 allows for a larger passageway along the curved side of the poppet valve 46 for easier flow of ftiel into the tank.

A check-ball valve 48 is provided in the valve housing 18 and located upstream from the poppet valve 46. The check-ball 48 valve is mounted through valve housing 18 substantially transverse to the longitudinal axis of the valve housing 18 and communicates between the fluid passage within valve housing 18 and storage tank 12 when ball 50 is unseated, to allow fuel to exit the fluid passage into the storage tank 12 through aperture 53. When the poppet valve 46 is closed, the pressure of the fuel forces the fuel though check-ball valve 48 by overcoming the spring 57 force so that the ball 50 is seated against seat 59. When the poppet valve 46 is closed, the fuel line from the fuel transport truck jumps to indicate to the operator that storage tank 12 is full. Once the fuel is no longer entering passageway 22, and the pressure from the transfer pump is eliminated, the spring 57 unseats ball 50. Excess fuel from above the poppet valve 46 may then bleed through the check-ball valve 48 into storage tank 12. Although the check-ball valve 48 is shown horizontally mounted in the illustrated embodiment, the check-ball valve 48 can be orientated in any direction to communicate between the fluid passage within valve housing 18 and the storage tank 12. The link 34 extends substantially parallel to a first length of the longitudinal axis of the valve housing 18 and the valve 48 is positioned along the first length.

When the fuel level in the storage tank 12 is less than full, the float 24 is normally in a vertically downward position. The first linkage assembly 26 essentially is in a vertically downward position such that the first centrally disposed pivot pin 28 has pivoted in a clockwise rotational movement. The second linkage assembly 40, as a result, pivoted in the clockwise movement to move poppet 46 from the annular valve seat 52.

As the storage tank begins To fill and the level of fuel begins to rise, the float 24 rises vertically upward moving the first and second links 30, 34 of the first linkage assembly 26 essentially vertically upward. As first and second links 30, 34 move upward, the third link 38 pivots the first centrally disposed pivot pin 28 in a counter-clockwise rotational movement. As pivot pin 28 rotates counter-clockwise, the pair of first links of the second internal lirnkge assembly 40 also moves in 4 counter-clockwise movement. The corresponding second internal link 45 moves in unison with the first internal linik 43 such that the poppet valve 46 moves downwardly toward the upper edge of the annular valve seat 52. Once the poppet valve 46 is against the respective seat 52, the fluid flow passage is closed to further flow of fuel into storage tanks.

When the poppet valve 46 is closed and fuel flow is shut off, a certain amount of excess fuel is captured within the fill pipe 16 above the poppet valve 46. When the fluid flow is shut off, and the transfer pump pressure is relieved, the check ball unseats from the valve seat 52 to allow fuiel to bleed through the orifice 53 into the storage tank 12.

The present invention positions the float 24 upstream from the poppet valve 46, so that the storage tank 12 is capable of receiving a larger capacity of firel before the float 24 is raised and seats the poppet valve 46 against annular seat 52. As a result, the full 90% capacity of the storage tank 24 can be used in most cases. valve seat 52. Once the poppet 46 is against the respective seat 52, the fluid flow passage is entirely closed to further flow of fuel into storage tanks.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An aboveground valve assembly for preventing overfilling of a liquid storage tank via a pump connectible to a fill pipe in the top of the tank, said valve assembly comprising:

a coupling member secured to an upper end of the fill pipe;

a cylindrical valve housing connected to a lower end of the fill pipe at one end and connected to a drop tube at an opposite end forming a fluid flow passageway;

a hollow cylindrical float coaxially mounted along the outer surface of the fill pipe for movement in response to changes in a fluid level in the storage tank;

a poppet valve disposed in the fluid flow passageway movable between an opened position and closed position;

actuating means for communicating movement of the float to the poppet valve, wherein the float is positioned closer to the top of the tank than the poppet valve to allow the fluid level in the storage tank to rise above the poppet valve before the poppet valve moves to a closed position including at least one link spaced from a longitudinal axis of the valve housing a distance greater than a maximum outer radius of the valve housing, wherein the at least one link extends substantially parallel to a first length of the longitudinal axis of the valve housing; and a bleed valve passing through a wall of the valve housing, positioned along the first length and moveable between an opened position and closed position in response to pressure of fluid in the fluid flow passageway.

2. The valve assembly of claim 1 wherein the actuating means further comprises:

a pivot pin engageable with the valve housing and extending transverse with respect to the fluid flow passageway, the pivot pin defining the pivot axis and connected to first and second crank arms wherein one crank arm is positioned external with respect to the valve hoasing and the other crank arm is positioned internal with respect to the valve housing.

3. The valve assembly of claim 2 wherein the actuating means further comprises:

the at least one link communicates movement ofthe float to the one crank arm; and a second link for communicating movement of the other crank arm to the poppet valve.

4. The valve assembly of claim 1 wherein the at least one link includes a pair of first diametrically opposed links disposed externally with respect to the valve housing.

5. The valve assembly of claim 1 wherein the poppet valve further comprises;

a bulbous portion for sealingly engaging the valve housing when the poppet valve is in the closed position; and a stem portion extending from the bulbous portion.

6. The valve assembly of claim 5 wherein the poppet valve further comprises;

means for guiding movement of the stem portion relative to the fluid flow passageway.

7. The valve assembly of claim 5 wherein the bulbous portion is operably associated with the actuating means.

8. The valve assembly of claim 1 wherein the bleed valve further comprises:

a second fluid flow passageway defined by the valve housing and extending transverse with respect to the fluid flow passageway extending substantially transverse to the longitudinal axis of the valve housing;

a spherical member for sealing engaging the second fluid flow passageway when the bleed valve is in the closed position; and biasing means for urging the spherical member out of sealing engagement with the second fluid flow passageway.

9. The valve assembly of claim 8 wherein the biasing means is a spring.

10. The valve assembly of claim 1 wherein the poppet valve further comprises:

a sealing portion translatable in response to movement actuating means.

11. An aboveground valve assembly for preventing overfilling of a liquid storage tank via a pump connectible to a fill pipe in the top of the tank, said valve assembly comprising:

a coupling member threadably and sealingly secured to an upper end of the fill pipe;

a cylindrical valve housing having a drop tube forming a fluid flow passageway;

a hollow cylindrical float coaxially mounted along the outer surface of the fill pipe for movement with the fluctuation of fluid level in the storage tank;

a poppet valve disposed in the fluid flow passageway, said poppet valve movable between an open position and closed position;

actuating means for communicating movement of the float to the poppet valve, wherein the float is positioned closer to the top of the tank than the poppet valve to allow the fluid level in the storage tank to rise above the poppet valve before the poppet valve moves to a closed position, wherein the actuating means includes a pair of diametrically opposed linkage assemblies each including at least one link spaced from a longitudinal axis of the valve housing a distance greater than a maximum outer radius of the valve housing and each externally connected to the float and further includes a second linkage assembly located in the fluid flow passageway and connected to the pair of diametrically opposed linkage assemblies, wherein said second linkage assembly is located downstream from said poppet valve; and a bleed valve upstream of the poppet valve with respect to fluid flow associated with the fluid flow passageway and positioned in the valve housing along the at least one link, wherein said bleed valve selectively communicates excess trapped fluid within the fluid flow passageway above the poppet valve and into the fluid storage tank in response to removal of transfer pump pressure within the passageway wherein the at least one link extends substantially parallel to a first length of the longitudinal axis of the valve housing and the bleed valve is positioned along the first length.

12. The valve assembly of claim 11 wherein said bleed valve is spring biased to a normally opened position.

13. The valve assembly of claim 11 further comprising:

a bleed valve moveable between an opened position and a closed position in response to pressure of fluid in the fluid flow passageway wherein the bleed valve passes through a side wall defining the fluid flow passageway substantially transverse to the longitudinal axis of the valve housing.

14. The valve assembly of claim 11, wherein the second linkage assembly is connected to the poppet valve by a cotter pin.

15. The valve assembly of claim 11 wherein the valve housing includes an annular seat sealingly engageable with the poppet valve.

16. The valve assembly of claim 15 wherein the poppet valve is moved vertically downward and toward the annular seat in response to vertically upward movement of the float.

17. A method for preventing overfilling of a liquid storage tank via a pump connectible to a fill pipe in the top of the tank comprising the steps of:

securing a coupling member to an upper end of the fill pipe;

forming a fluid flow passageway by connecting cylindrical valve housing at one end to a lower end of the fill pipe and an opposite end to a drop tube at an opposite end;

coaxially mounting a hollow cylindrical float along the outer surface of the fill pipe for movement in response to changes in a fluid level in the storage tank;

disposing a poppet valve in the fluid flow passageway movable between an opened position and closed position;

communicating movement of the float to the poppet valve with actuating means including at least one link spaced from a longitudinal akis of the valve housing a distance greater than a maximum outer radius of the valve housing, wherein the at least one link extends substantially parallel to a first length of the longitudinal axis of the valve housing and wherein the float is positioned closer to the top of the tank than the poppet valve to allow the fluid level in the storage tank to rise above the poppet valve before the poppet valve moves to a closed position; and passing a bleed valve through a wall of the valve housing, the bleed valve moveable between an opened position and closed position in response to pressure of fluid in the fluid flow passageway and positioned along the first length.

* * * * *